United States Patent [19]
Mukai et al.

[11] Patent Number: 5,685,077
[45] Date of Patent: Nov. 11, 1997

[54] ELECTRIC SHAVER

[75] Inventors: Kiyotaka Mukai; Takao Nobuhisa, both of Hyogo, Japan

[73] Assignee: Sanyo Electric Co., Ltd., Osaka, Japan

[21] Appl. No.: 495,374

[22] Filed: Jun. 28, 1995

[30] Foreign Application Priority Data

Jun. 29, 1994 [JP] Japan ................... 6-147850
Jun. 29, 1994 [JP] Japan ................... 6-147851

[51] Int. Cl.$^6$ ........................ B26B 19/28
[52] U.S. Cl. ........................ 30/43.92
[58] Field of Search ............... 30/43, 43.7, 43.8, 30/43.9, 43.91, 43.92

[56] References Cited

U.S. PATENT DOCUMENTS

| 3,105,163 | 9/1963 | Camp | 30/43.92 |
| 3,898,732 | 8/1975 | Krainer | 30/43.92 |
| 4,240,200 | 12/1980 | Bukoschek | 30/43.92 |
| 4,400,875 | 8/1983 | Buzzi et al. | 30/43.92 |
| 4,428,117 | 1/1984 | Horii et al. | 30/43.91 |
| 4,628,607 | 12/1986 | Bertram et al. | 30/43.92 |

FOREIGN PATENT DOCUMENTS

| 334245 | 4/1976 | Austria . |
| 45107 | 2/1982 | European Pat. Off. . |
| 151504 | 8/1985 | European Pat. Off. . |
| 58-16357 | 9/1978 | Japan . |
| 58-17869 | 2/1983 | Japan . |
| 1009659 | 11/1965 | United Kingdom . |
| 1091081 | 11/1967 | United Kingdom . |
| 1460314 | 1/1977 | United Kingdom . |
| 2014372 | 8/1979 | United Kingdom . |

OTHER PUBLICATIONS

U.K. Search Report dated Jul. 31, 1995, Appl. No. GB9511550.7.

*Primary Examiner*—Hwei-Siu Payer
*Attorney, Agent, or Firm*—Loeb & Loeb LLP

[57] ABSTRACT

An electric shaver comprises a pivoting swing end, and an oscillator which is coupled to the swing end through a transmission. The transmission transmits a pivotal movement of the swing end to a horizontally reciprocating movement of the oscillator. An inner blade member coupled to the oscillator slidingly engages an outer blade member. Such a structure enables the inner blade member to move smoothly, because the inner blade member slides only horizontally.

16 Claims, 10 Drawing Sheets

ELECTRIC SHAVER

FIELD OF THE INVENTION

The present invention relates generally to an electric shaver.

BACKGROUND OF THE INVENTION

Japanese Utility Model Laid-open No. SHO 58-17869 shows an electric shaver in which an inner blade member is reciprocated by an electromagnet excited by alternating current. In such an electric shaver, the electromagnet is excited by alternating current at 100 volts such that the reciprocation of the inner blade member is relatively strong. In addition, because a separate motor for reciprocating the inner blade member is not needed, this electric shaver has excellent durability.

As shown in FIG. 1, the driving source of the shaver comprises an electromagnet 1 and a swing bar 2 which is disposed adjacent to the electromagnet 1. The electromagnet 1 comprises the excitation core 1A of a U-shaped iron core, and a pair of coils 1B, each of which is coiled around an end of the excitation core 1A.

The swing bar 2 is coupled so as to swing about a post 3 which is fixed to frame 16. The swing bar 2 has a U-shaped swing core 2A at the bottom thereof. The top of the swing bar 2 is coupled to an inner blade member 6 through a spring 8. Also, the swing bar 2 is resiliently biased by springs 5 in a neutral position in which the ends of the U-shaped swing core 2A are not in close proximity to the ends of the U-shaped excitation core 1A.

When the excitation core 1A is excited by the line alternating current, each end of the U-shaped excitation core 1A alternately attracts and releases each end of the U-shaped swing core 2A adjacent thereto. As a consequence, the U-shaped swing core 2A swings back and forth in a reciprocating motion.

FIG. 2 shows an operational schematic diagram of the shaver of FIG. 1. As indicated by a dash and dotted line, the top of the swing bar 2 reciprocates along an arc. In other words, the top of the swing bar 2 moves both vertically and horizontally. In order to absorb the vertical movement of the top of the swing bar 2, the inner blade member 6 is coupled to the top of the swing bar 2 through the spring 8. As the spring 8 absorbs the vertical movement of the top of the swing bar 2, the spring 8 resiliently presses the inner blade member 6 to the inner surface of an outer blade member (not shown). As a result, the inner blade member 6 reciprocates only horizontally along the inner surface of the outer blade member.

One disadvantage of this shaver is that the inner blade member 6 is not uniformly pressed against the inner surface of the outer blade member. More specifically, as the top of the swing bar 2 passes the center, the inner blade member is strongly pressed to the inner surface of the outer blade member. On the other hand, as the top of the swing bar 2 reaches either end of the reciprocating movement along the arc, the inner blade member is less strongly pressed to the inner surface of the outer blade member.

Such nonuniformity of pressure can cause a number of problems including irregular wear of the thin outer blade member. Such irregular wear can reduce the lifetime of the outer blade member. On the other hand, if the outer blade member is designed to be thicker so to increase its lifetime, a thicker outer blade member can make it more difficult to obtain a close shave.

Further, the amplitude of the reciprocal motion of the inner blade member depends on the distance between the post 3 and the top of the inner blade member 6. This distance can vary from model to model so that different models of the shavers can have different amplitudes of reciprocal motion of the inner blade member 6. Because the amplitude of reciprocal motion can affect the variation of the pressure of the inner blade member against the outer blade member as the inner blade member reciprocates, the inner blade member 6 in each particular model may be pressed against the inner surface of the outer blade member in a different manner. Such different pressures can cause each model to have a different lifetime for the outer blade member, or a different shaving capability. In this situation, it is difficult to maintain uniform qualities or durability in different models of electric shavers.

THE SUMMARY OF THE INVENTION

It is an object of the present invention to provide an electric shaver in which an inner blade member is uniformly pressed to the inner surface of an outer blade member.

It is another object of the present invention to provide an electric shaver in which the amplitude of motion of the inner blade member does not depend on the design of the inner blade member.

These and other objects are achieved by an electric shaver, in accordance with one embodiment of the present invention, comprising: a swing end actuated by a power source for pivotal motion, transmission means for transmitting pivotal movement of the swing end to a horizontally reciprocating movement of an oscillator, an inner blade member coupled to the oscillator; and an outer blade member positioned so that the inner blade member slidingly engages the outer blade member.

In accordance with one embodiment of the present invention, by the transmission means, the inner blade member coupled to the oscillator reciprocates substantially horizontally. Therefore, the inner blade member is uniformly pressed to the inner surface of the outer blade member. Moreover, the amplitude of motion of the inner blade member is uniform in accordance with the horizontally reciprocating movement. As a result, the amplitude of the motion of the inner blade member does not depend on the design of the inner blade member.

DETAILED DESCRIPTION OF THE PREFERRED EMBODIMENTS

An embodiment of the present invention is described with reference to FIGS. 3–13. As will be explained in greater detail below, an electric shaver of the illustrated embodiment includes a pivot member, and an oscillator which is coupled to the pivot member through a transmission mechanism. The transmission mechanism transmits a pivotal movement of the pivot member to a horizontally reciprocating movement of the oscillator. Then an inner blade member coupled to the oscillator slidingly engages an outer blade member. Such a structure enables the inner blade member to smoothly move, because the inner blade member slides substantially horizontally. Further, the amplitude of the inner blade member is substantially the same as that of the oscillator. As a consequence, a spring positioned between the oscillator and the inner blade member to bias the inner blade member toward the outer blade member will provide a substantially constant spring force as the oscillator and inner blade member oscillate. As a result, more even wear of the blades is provided.

Figure 1:
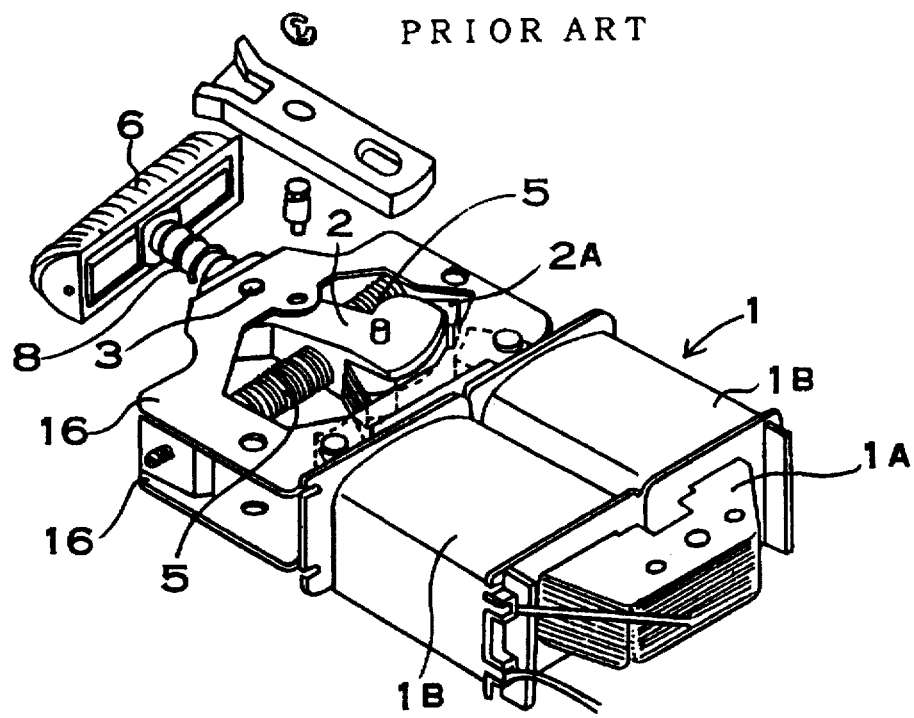
FIG. 1 is a perspective view of a prior art shaver.
Figure 2:
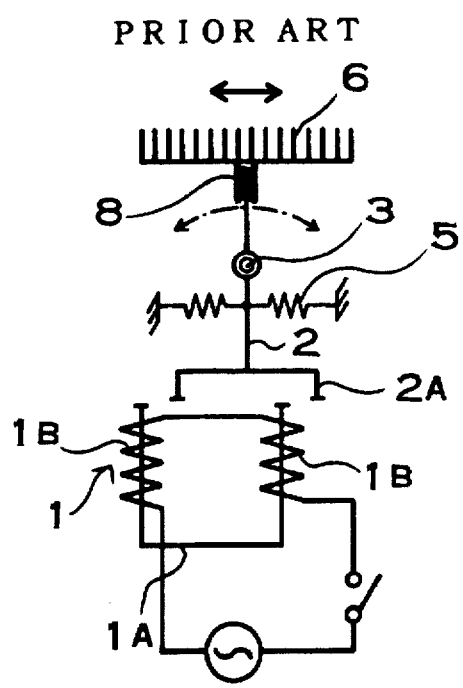
FIG. 2 is an operational diagram of the shaver of FIG. 1.
Figure 3:
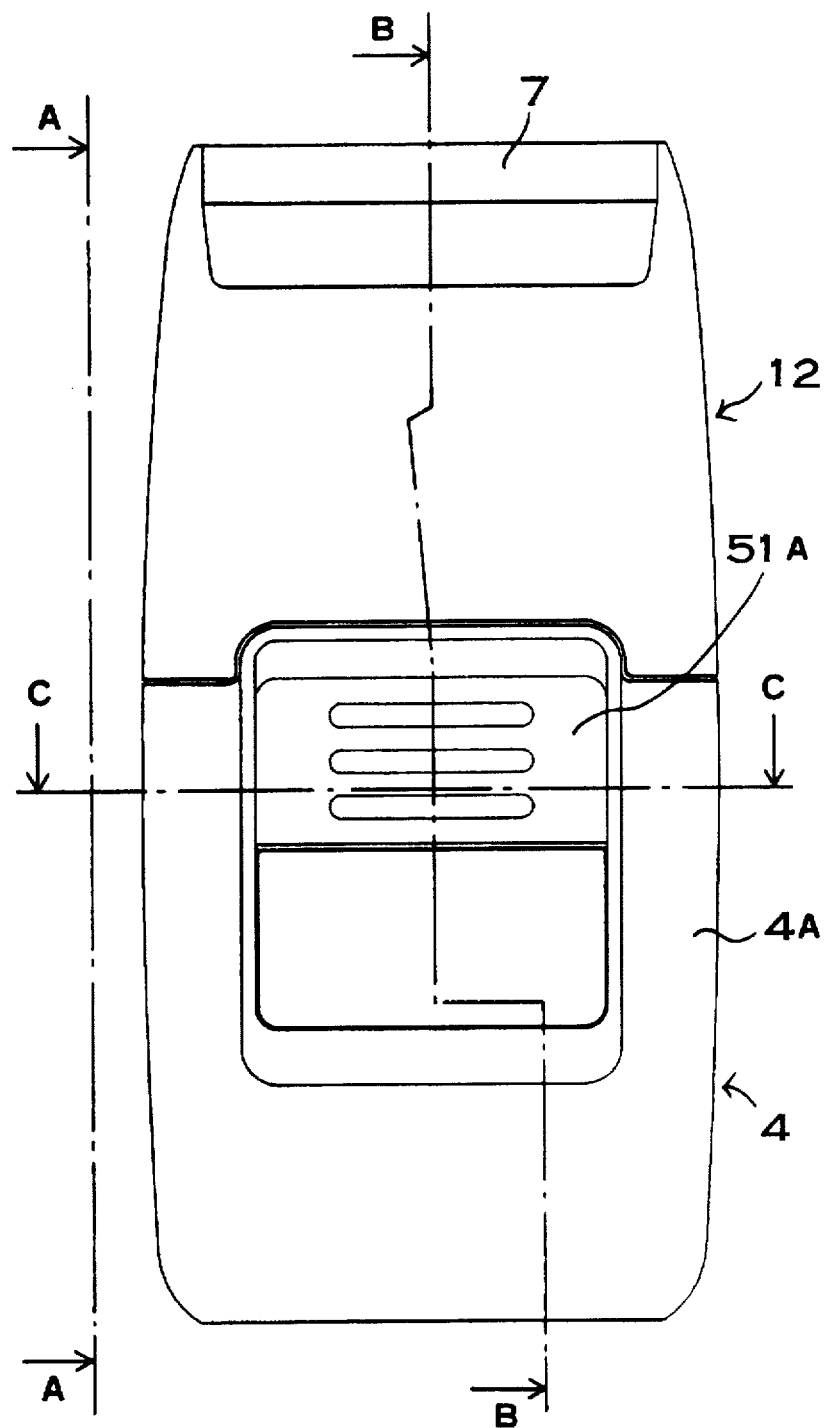
FIG. 3 is a front view of an electric shaver in accordance with one embodiment of the present invention.
Figure 4:
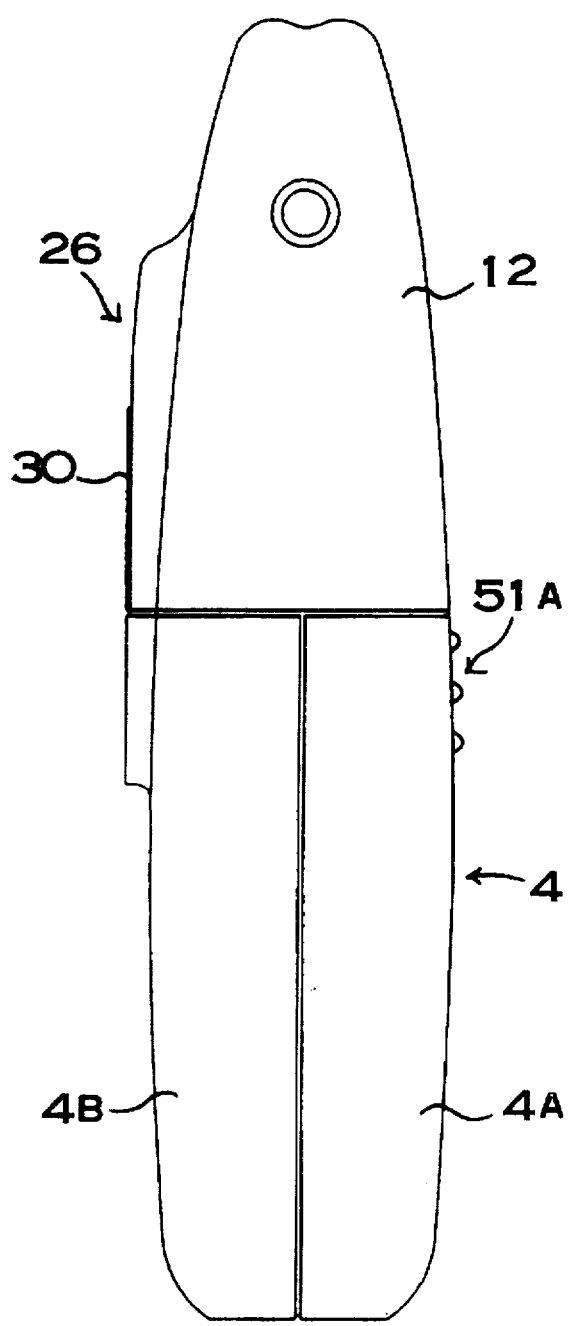
FIG. 4 is a side view of the electric shaver of FIG. 3 along the line A—A.
Figure 5:
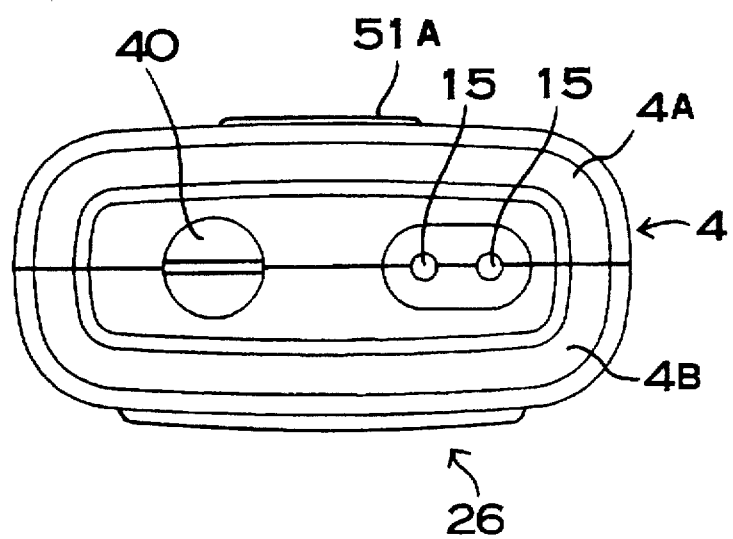
FIG. 5 is a bottom view of the electric shaver of FIG. 3.

As shown in FIGS. 3–5, an electric shaver comprises a generally rectangular case 4 and a detachable head 12 secured to the top of the case 4. The case 4 comprises a front half case 4A and a rear half case 4B.

Figure 6:
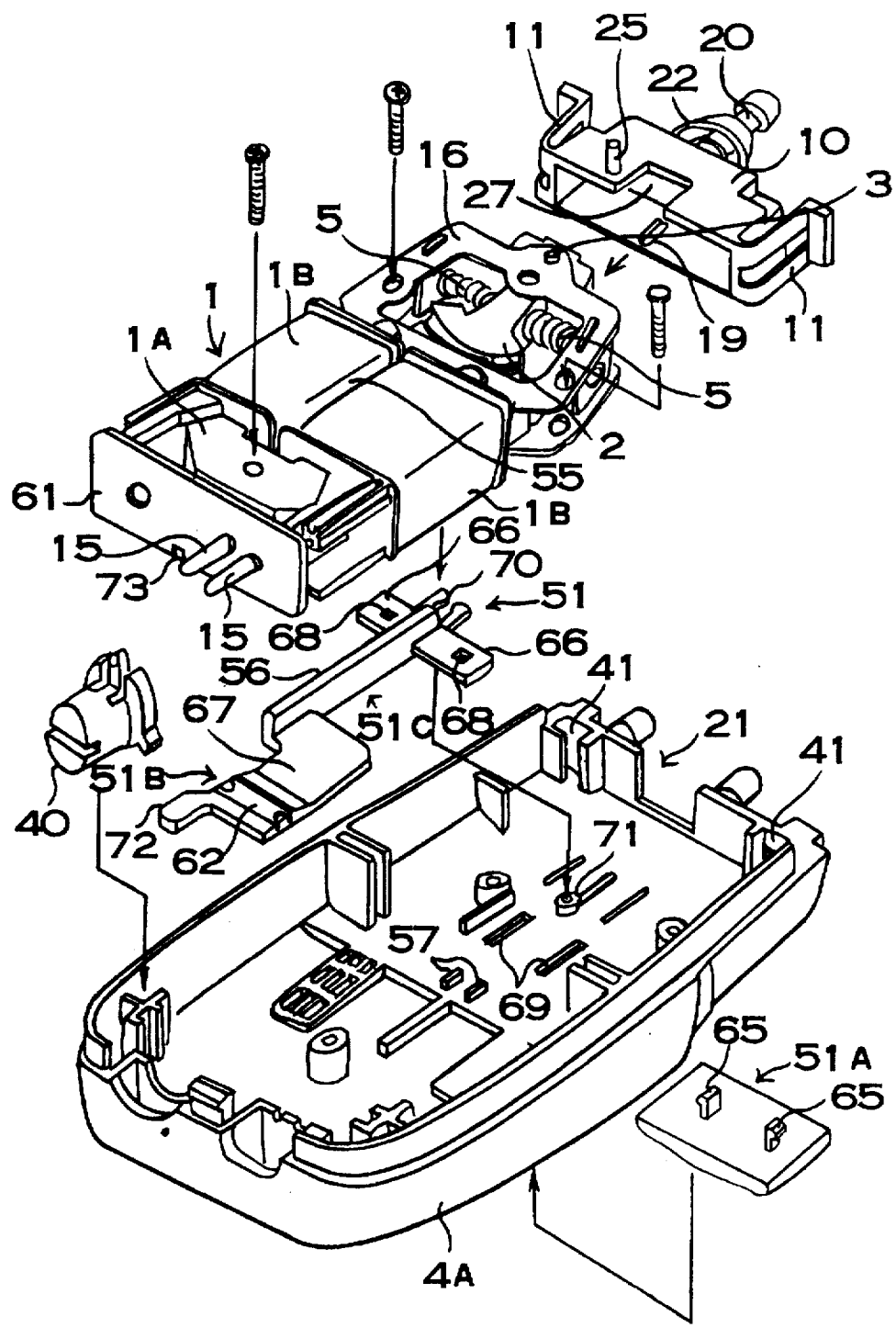
FIG. 6 is an exploded perspective view showing main parts of the electric shaver.
Figure 7:
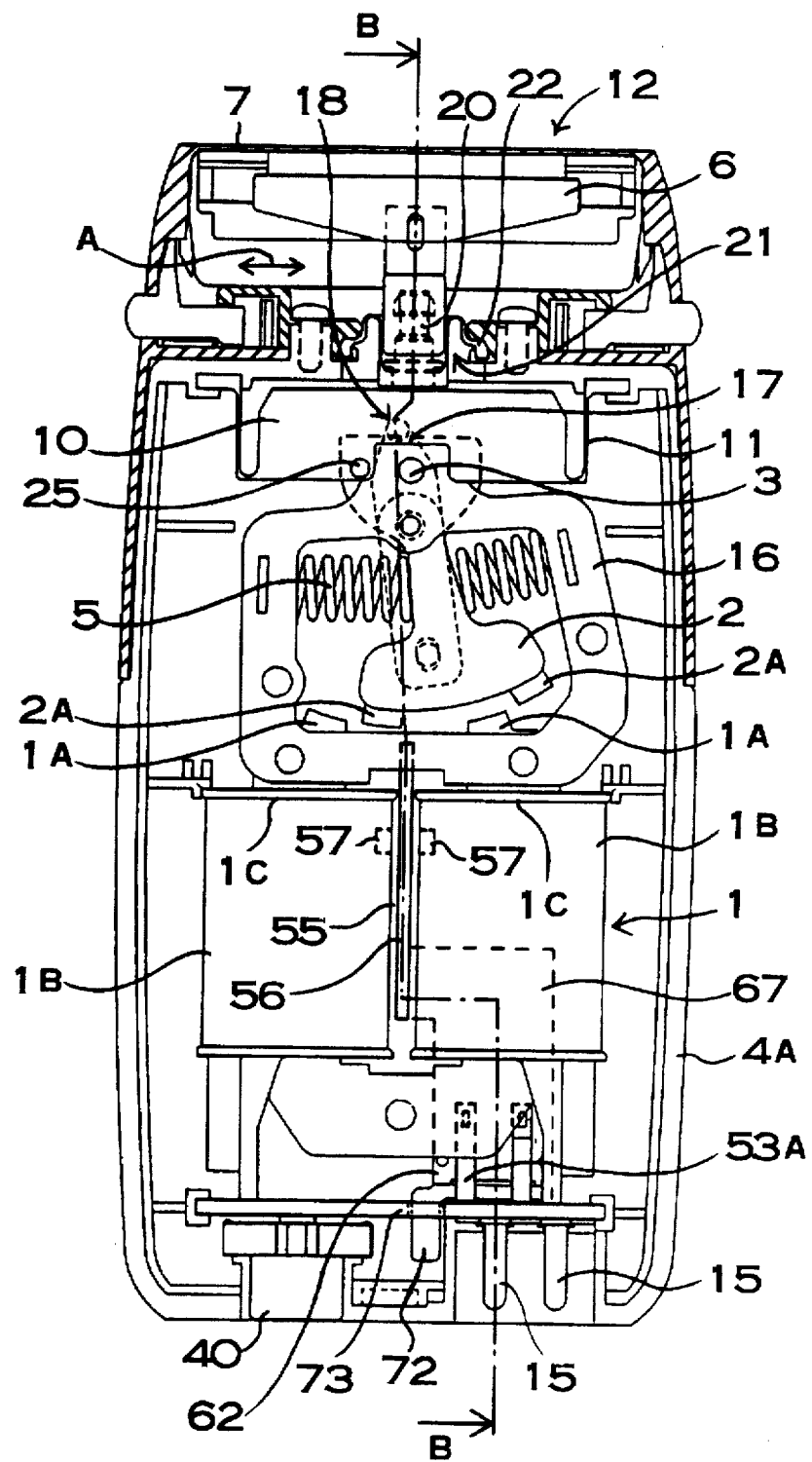
FIG. 7 is a front view of assembled main parts of FIG. 6, including various parts inside a detachable head. The detachable head is shown as a cross-sectional view.
Figure 8:
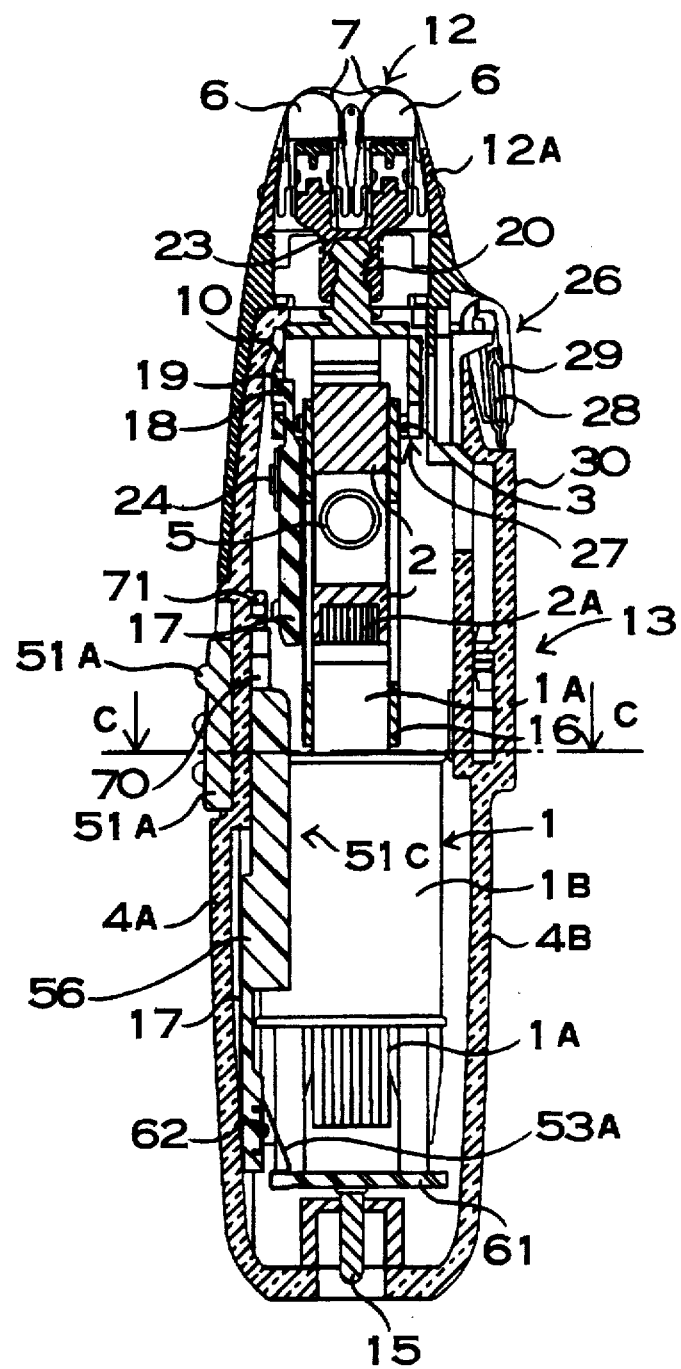
FIG. 8 is a cross-sectional view of the electric shaver of FIG. 3 along the line B—B of FIG. 3, or along the line B—B of FIG. 7.

As shown in FIGS. 6–8, the driving or power source of the shaver comprises an electromagnet 1 and a pivot or swing bar 2 which is disposed adjacent to the electromagnet 1. The electromagnet 1 comprises the excitation core 1A of a U-shaped iron core which is fixed to the lower portion of the case 4, and a pair of coils 1B which are located around both ends of the excitation core 1A. The coils 1B are connected to plug pins 15 through a switch structure to be described below. A power source cord (not shown) is connected to the plug pins 15 when the shaver is used.

The swing bar 2 is pivotally coupled to a frame 16 so as to swing or pivot around a post 3. The frame 16 comprises a pair of spaced generally rectangular rings which are fixed by screws to each other. The frame 16 is attached to both ends of the excitation core 1A. The swing bar 2 has a U-shaped swing core 2A at the bottom thereof. The top of the swing bar 2 extends beyond the frame 16.

The swing bar 2 is resiliently biased by springs 5 in an offset position where the ends of the U-shaped swing core 2A do not face the ends of the U-shaped excitation core 1A as shown in FIG. 7 (hereinafter this position is referred to as the "neutral" position). The springs 5 resiliently couple the swing bar 2 to the frame 16.

When the excitation core 1A is excited by a line alternating current, each end of the U-shaped excitation core 1A alternately attracts the adjacent end of the U-shaped swing core 2A, thereby causing the U-shaped swing core 2A to swing or oscillate. For example, when 50 hertz alternating current is used, the U-shaped swing core 2A is attracted and oscillates 100 times a second. During each complete cycle in 50 hertz alternating current, magnetic flux density generated by the coils 1B reaches a peak and then falls to zero, twice. When the magnetic flux density reaches a peak, the attraction of the U-shaped excitation core 1A for the U-shaped swing core 2A is at a maximum, drawing the swing core 2A adjacent to the excitation core 1A. When magnetic flux density is zero, the attractive force is likewise zero such that the U-shaped swing core 2A is at the neutral position.

The aforementioned swinging or pivotal movement of the swing bar 2 is converted to a reciprocating sliding movement of an oscillator 10, as described below in detail. An actuating bar 17 (FIG. 8) transmits the movement of the swing bar 2 to the oscillator 10. The bottom end of the actuating bar 17 is coupled to a side surface of the swing bar 2. The actuating bar 17 is also pivotally connected to the frame 16 by a pin 24 at the middle thereof. A projection 18 located at the top of the actuating bar 17 is coupled to the oscillator 10 in the following manner. The projection 18 is inserted into a slit 19 of the oscillator 10, and slideably engages the slit 19. As best shown in FIG. 6, the slit 19 extends along the lengthwise direction of the case 4. When the swing bar 2 swings, the projection 18 reciprocates along an arc-shaped locus. As the projection 18 slides within the slit 19, the lengthwise movement relative to the oscillator 10 is absorbed. Therefore, the oscillator 10 reciprocates only in the transverse direction in the illustrated embodiment.

The oscillator 10 is made of a molded plastic, and is coupled to the case 4 through integral resilient arms 11 at both ends thereof. As best shown in FIGS. 6 and 7, each resilient arm 11 extends first outwardly and then upwardly from the bottom edges of the oscillator 10. At the top of each resilient arm 11 is a tab-shaped fixing portion which is inserted into a correspondingly shaped receiving slot 41 (FIG. 6) of the case 4. In this manner, the oscillator 10 is suspended from the top of the case 4 by the resilient arms 11 which enable the oscillator 10 to reciprocate. In this manner, the oscillator 10 reciprocates in a substantially linear direction as represented by arrow A of FIG. 7.

The oscillator 10 has a driving post 20 which projects from the top center of the oscillator. The driving post 20 passes through a penetration hole 21 (FIGS. 6 and 7) of the top of the case 4, and is coupled to a joint base member 23 (FIG. 8) on which a pair of inner blade members 6 are mounted. The gap between the penetration hole 21 and the driving post 20 is covered by a resilient rubber ring 22 (FIG. 7) to prevent cut hair from intruding into the interior of the case 4. The outer periphery of the resilient rubber ring 22 is fixed to an inner peripheral edge of the penetration hole 21, and the inner peripheral edge of the resilient rubber ring 22 loosely contacts the driving post 20.

Next, as shown in FIGS. 6–10, a trimmer unit 26 is mounted on the rear case 4B. As best shown in FIG. 6, the oscillator 10 has a cutout 27 at the center of a side surface thereof, and has an actuating pin 25 for a trimmer unit 26 (FIG. 8) beside the cutout 27. As best shown in FIGS. 6 and 8, the cutout 27 enables the oscillator 10 to move without touching one end of the post 3 which slightly protrudes outward from the frame 16. If the actuating pin 25 were located at the center of the side surface of the oscillator 10 without the cutout 27, it may be necessary for the width of the oscillator 10 to become wider in order to prevent the inner surface of the oscillator 10 from touching the end of the post 3. A more narrow oscillator 10 is preferred to facilitate a thinner electric shaver.

Figure 10:
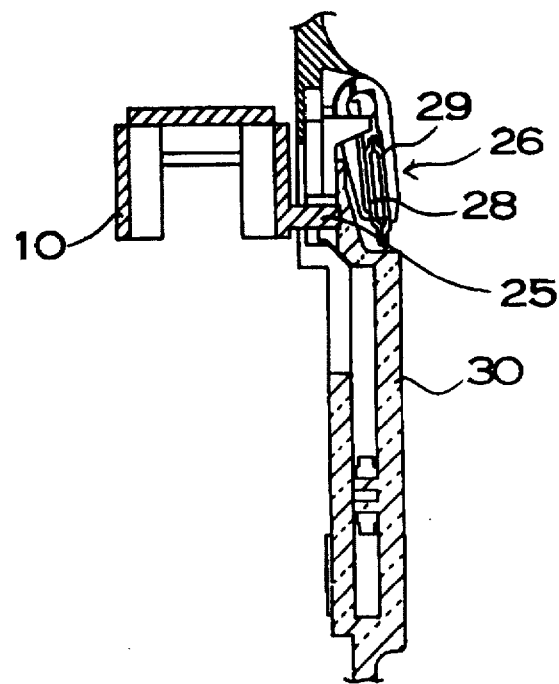
FIG. 10 is a cross-sectional view of constituent parts of a trimmer.

As explained below, the actuating pin 25 transmits the reciprocatory sliding motion of the oscillator 10 to a comb-shaped movable blade member 28 (best shown in FIG. 10).

A trimmer unit 26 is mounted so as to be pivotable about a pivot so as to be actuatable between a horizontally projecting operative position and a vertically folded inoperative position. The trimmer unit 26 includes a stationary comb-shaped blade member 29 fixed to a base made of a synthetic resin, and a comb-shaped movable blade member 28. When a trimmer switch 30 is moved upward (not shown), the trimmer unit 26 assumes the horizontally projecting operative position in which the reciprocatory sliding motion of the oscillator 10 is transmitted to the comb-shaped movable blade member 28. When the trimmer switch 30 is downward, the trimmer unit 26 returns to its vertically folded inoperative position.

Figure 11:
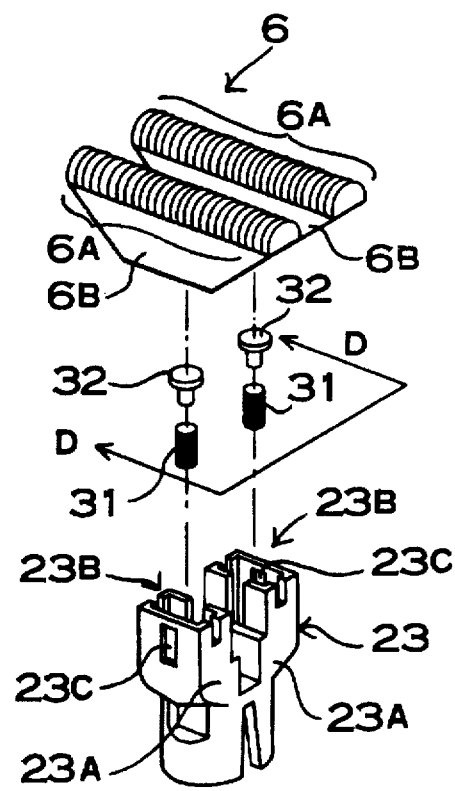
FIG. 11 is an exploded perspective view showing an inner blade member and a joint base member.
Figure 12:
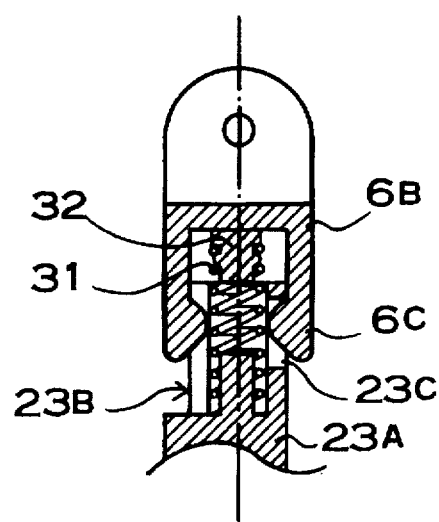
FIG. 12 is a cross-sectional view of the inner blade member and the joint base member along the line D—D of FIG. 11.

As best shown in FIG. 8, the shaver has two rows of outer blade members 7. In detail, the detachable head 12 comprises an outer blade case 12A and two rows of the outer blade members 7 which are detachably secured on the outer blade case 12A. Each outer blade member 7 is made of a thin metal screen having many hair guiding perforations. Each outer blade member 7 is detachably secured to the blade case 12A and is curved in a semicylindrical shape. Inner blade members 6 are disposed inside the outer blade member 7. As shown in FIGS. 11 and 12, each inner blade member 6 includes many small semicircular inner blades 6A secured to an inner blades base 6B.

The joint base member 23 is coupled to the driving post 20 of the oscillator 10. The inner blades base 6B is in turn supported by the base member 23. Therefore, by the reciprocatory sliding movement of the oscillator 10, the small semicircular inner blades 6A slide along the inner surface of the outer blades 7, while springs 31 positioned between the base member 23 and the inner blades base 6B press the small semicircular inner blades 6A to the inner surface of the outer blade member 7.

As best shown in FIG. 11, the joint base member 23 has a pair of mounting posts 23A which each includes a spring holding recess 23B and a slit 23C. As best shown in FIG. 12, each inner blades base 6B has a resilient hook portion 6C which engages the slit 23C. The spring 31 set in the spring holding recess 23B, has a cap 32 which presses the inner blade member 6 to the inner surface of the outer blade member 7.

In an electric shaver in accordance with an embodiment of the invention, the swing core 2A which moves along an arc is coupled to the inner blade members 6 through the oscillator 10. The slit 19 of the oscillator 10 transmits the arc movement of the swing core 2A to the horizontally reciprocating movement of the inner blade member 6. Therefore, the spring force applied by the springs 31 remains substantially constant as the inner blade members 6 reciprocate. Consequently, each inner blade member 6 is pressed against the inner surface of the outer blade member 7 by the spring 31 with a substantially constant force while the blade reciprocates. This structure reduces non-uniform wear of the outer blade member 7 or the inner blade member 6, and increases the life of the outer blade member 7 or the inner blade member 6. Because the blades wear more uniformly, a thinner outer blade member 7 may be utilized. A thinner outer blade member 7 enables the shaver to provide a closer shave.

Further, the amplitude of reciprocal motion of the inner blade member 6, like that of the oscillator 10, is flat. Consequently, the amplitude of motion of the inner blade member 6 does not depend on the design of the inner blade member 6. When different models use a standardized case 4 including various standardized parts, but different outer blade members or different inner blade members, a consistent amplitude of motion facilitates the design of the inner blade member and the outer blade member to provide similar blade lifetimes and closeness of shaves, from model to model. These similarities are advantageous, compared with many prior art shavers having different amplitudes which can result in different blade lifetimes or different shaving characteristics.

Figure 13:
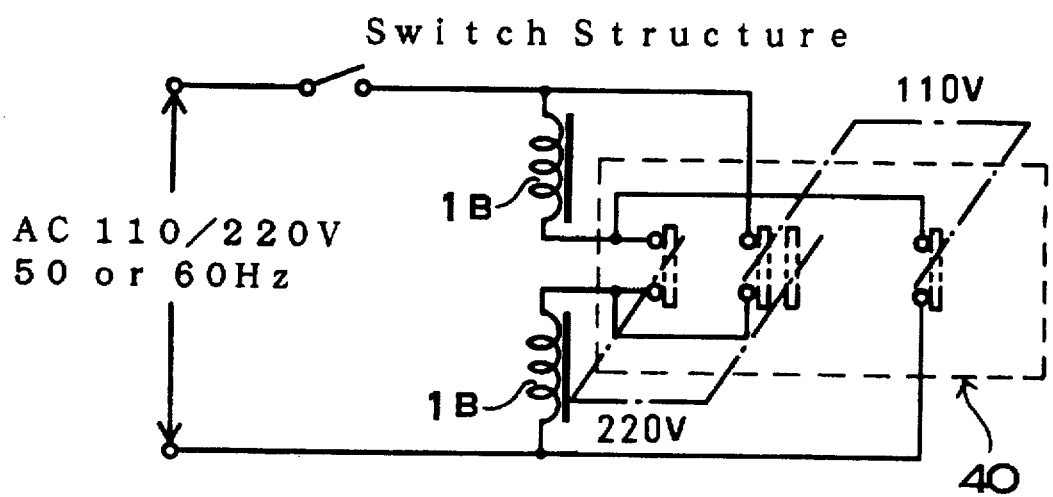
FIG. 13 is a circuit diagram of the electric shaver.

A switching structure will be described below in detail. The shaver can accept line voltages of both 110V and 220V. Before using the shavers, the user selects the appropriate voltage by use of a voltage select switch 40. FIG. 13 shows a circuit diagram. As shown in FIG. 13, when the voltage is 110V, coils 1B are connected in parallel. On the other hand, when the voltage is 220V, coils 1B are connected in series.

The switching mechanical structure will be discussed below in connection with FIGS. 6–8. The switching mechanical structure mainly comprises a sliding member 51 and a printed board 61. The printed board 61 has a couple of resilient metal terminals 53A. The sliding member 51 has a corresponding metal board 62. When a pair of the resilient metal terminals 53A contact the metal board 62 (this position is not shown in the figures), the switching function is ON. Then the voltage is applied to coils 1B. On the other hand, when the resilient metal terminals 53A do not contact the metal board 62 (best seen in FIG. 8), the switching function is OFF.

The sliding member 51 is preferably made of a plastic. It comprises a knob portion 51A (FIG. 8) which is carried outside the front case 4A, and an electric contact portion 51B which is coupled to the knob portion 51A through a rod portion 51C.

The knob portion 51A is a generally tab-shaped, and has a pair of connecting hooks 65 which are integrally formed at the back surface thereof. Each connecting hook 65 comprises a stem and a hook portion at the tip thereof which extends outward. Each hook portion is inserted to a corresponding connection hole 68 which is located on a flat wing 66 at the top of the rod portion 51C. The front case 4A has slits 69 which extend lengthwise so that the connection hooks 65 of the knob portion 51A can slide therein.

In addition, a pair of resilient sliding guides 70 are integrally and resiliently formed at the top of the rod portion 51C. Each sliding guide 70 comprises a stem and a projection at the tip thereof which projects inside. Responding to the up and down movement of the knob portion 51A by a finger, the sliding member 51, including the resilient slide guides 70, also move up and down. In detail, by a vertical outer force from the finger for the up and down movement of the knob portion 51A, the pair of projections of the resilient slide guides 70 rides over a cylinder 71 which is integrally formed on the front case 4A as the switching function is turned on or off. Therefore, such a structure as includes the resilient slide guides 70 and the cylinder 71 limits unnecessary movement of the sliding member 51.

The electric contact portion 51B comprises a plate 67 which is integrally formed to the rod portion 51C. The metal board 62 is fixed on the plate 67. As shown in FIGS. 7 and 8, when the sliding member 51 is located down, the metal terminals 53A do not contact the metal board 62. At this time, the switching function is OFF. On the other hand, when the sliding member 51 is located up (not shown), the metal terminals 53A contact the metal board 62 and the switching function is ON.

The electric contact portion 51B has a guide rod 72 which protrudes downward at the bottom thereof. The guide rod 72 is loosely engaged with a guide hole 73 (FIG. 6 and 7) which is located in the printed board 61 (FIG. 6). Therefore, the guide rod 72, which slides within the guide hole 73, guides the movement of the sliding member 51 in the proper direction.

The rod portion 51C which connects the knob portion 51A to the electric contact portion 51B comprises a reinforced rib 56. As the cross-sectional view of the reinforced rib 56 of FIG. 9 shows, the reinforced rib 56 is disposed in a space 55 between the coils 1B, between bobbin flange portions 1C on which coils 1B are wound.

Figure 9:
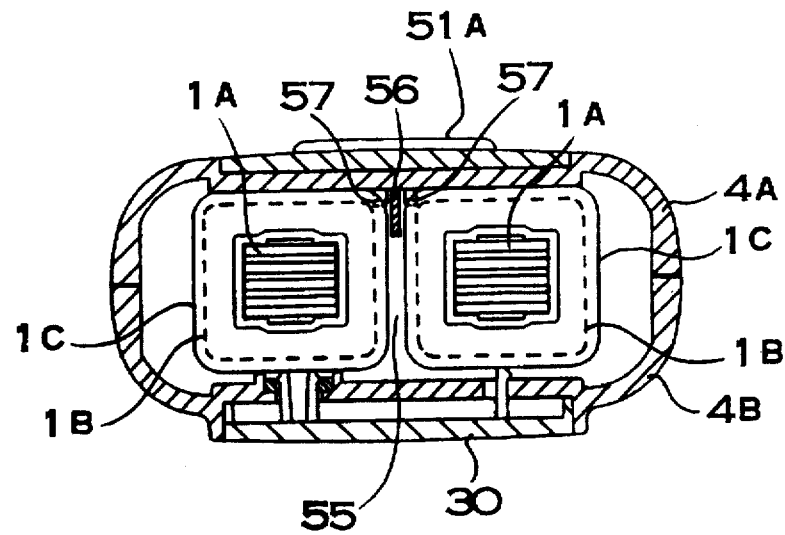
FIG. 9 is a cross-sectional view of the electric shaver of FIG. 3 along the line C—C of FIG. 3, or along the line C—C of FIG. 8.

A couple of guide projections 57 are integrally formed on the front case 4A, and located to both sides of the reinforced rib of 56 of the sliding member 51 (FIGS. 6 and 9). The guide projections 57 guide the movement of the sliding member 51 in the vertical direction.

By utilizing space 55 between the coils 1B, the reinforced rib 56 is designed to be thick enough to prevent warping which could be caused by long term usage.

In the embodiment, a space 55 is formed between the coils 1B. However, in another application to the shaver, such a space can be formed between a couple of batteries which drive a motor coupled to an inner blade member, and also between a battery and a motor which are disposed in parallel with the battery.

It will, of course, be understood that modifications of the present invention, in its various aspects will be apparent to those skilled in the art, some being apparent only after study and others being matters of routine mechanical or electronic design. As such, the scope of the invention should not be limited by the particular embodiment herein described but should be defined only by the appended claims and equivalent thereof.

What is claimed:

1. An electric shaver driven by a power source, said electric shaver comprising:
   a swing portion for swinging, actuated by the power source;
   transmission means for transmitting a movement of the swing portion to a horizontally reciprocating movement;
   an oscillator driven by the horizontally reciprocating movement;
   an inner blade member coupled to the oscillator, the inner blade member including a plurality of inner blades, each inner blade having an outer edge;
   an outer blade member positioned so that the outer edges of the inner blades slidingly engage the outer blade member; and
   a pivotally disposed swing bar, wherein said power source includes an electromagnet for driving the swing bar, the swing bar being coupled to the swing portion to swing the swing portion, wherein the electromagnet includes a U-shaped core and spaced coils wound around each end of the U-shaped core, and the electric shaver includes:
      a switching structure including:
         a finger manipulable knob portion;
         a switch; and
         a rod portion for connecting the knob portion to the switch, the rod portion being located in a space between the coils.

2. The electric shaver of claim 1, including a pair of guide means for guiding movement of the rod portion, the guide means being located on both sides of the rod portion, between the coils.

3. An electric shaver driven by a power source, said electric shaver comprising:
   a moving portion for reciprocal motion in at least two dimensions, and actuated by the power source;
   transmission means for transmitting a movement of the moving portion to one dimension of reciprocating movement;
   an oscillator driven by the one dimensional reciprocating movement;
   an inner blade member coupled to the oscillator, the inner blade member including a plurality of inner blades, each inner blade having an outer edge;
   an outer blade member positioned so that the outer edges of the inner blades slidingly engage the outer blade member; and
   a swing bar being swingably disposed, wherein said power source includes an electromagnet for driving said swing bar, the swing bar being coupled to the moving portion so that the moving portion swings, wherein the electromagnet includes a U-shaped core and coils wound around each end of the U-shaped core, the electric shaver including:
      a switching structure including:
         a knob portion for being moved by a finger;
         an electric operation portion for electric operation, cooperating with an electric circuit, and the knob portion; and
         a rod portion for connecting the knob portion to the electric operation portion, the rod portion being located in a space between the coils.

4. The electric shaver of claim 3, including a pair of guide means for guiding a movement of the rod portion, the guide means being located on both sides of the rod portion, between the coils.

5. An electric shaver, comprising:
   a support member;
   a pivot member coupled pivotally around a post to the support member;
   an actuating bar, a first end of the actuating bar being coupled to the pivot member, a second end of the actuating bar having a swing portion and being pivotally coupled to the support member by a pin at a middle portion of the support member;
   transmission means for transmitting a movement of the actuating bar to a horizontally reciprocating movement;
   an oscillator driven by the horizontally reciprocating movement;
   an inner blade member coupled to the oscillator, the inner blade member including a plurality of inner blades, each inner blade having an outer edge;
   an outer blade member positioned so that the outer edges of the inner blades slidingly engage the outer blade member; and
   a spring pressing the outer edges of the inner blades to the outer blade member, wherein the transmission means includes a vertical slit in the oscillator, the actuating bar having a projection inserted in the vertical slit and loosely coupled to the vertical slit.

6. The electric shaver according to claim 5, wherein the oscillator has an opening for insertion of said projection and upper portions of said pivot member and said support member including said post, said vertical slit being in a first face of said oscillator adjacent said opening, said oscillator including a cutout in a second face of said oscillator adjacent said opening and opposed to said first face, said cutout preventing said oscillator from touching an end of said post during said horizontally reciprocating movement.

7. The electric shaver according to claim 5, including a power source including an electromagnet for driving said pivot member, wherein the electromagnet includes a U-shaped core and coils wound around each end of the U-shaped core, the electric shaver including:

a switching structure including:
  a knob portion for being moved by a finger;
  an electric operation portion for electric operation, cooperating with an electric circuit, and the knob portion; and
  a rod portion for connecting the knob portion to the electric operation portion, the rod portion being located in a space between the coils.

8. The electric shaver of claim 7, including a pair of guide means for guiding movement of the rod portion, the guide means being located on both sides of the rod portion, between the coils.

9. The electric shaver according to claim 8, wherein the oscillator has an opening for insertion of said projection and upper portions of said pivot member and said support member including said post, said vertical slit being in a first face of said oscillator adjacent said opening, said oscillator including a cutout in a second face of said oscillator adjacent said opening and opposed to said first face, said cutout preventing said oscillator from touching an end of said post during said horizontally reciprocating movement.

10. The electric shaver according to claim 7, wherein the oscillator has an opening for insertion of said projection and upper portions of said pivot member and said support member including said post, said vertical slit being in a first face of said oscillator adjacent said opening, said oscillator including a cutout in a second face of said oscillator adjacent said opening and opposed to said first face, said cutout preventing said oscillator from touching an end of said post during said horizontally reciprocating movement.

11. An electric shaver, comprising:

a support member;

a pivot member coupled pivotally around a post to the support member;

an actuating bar, a first end of the actuating bar being coupled to the pivot member, a second end of the actuating bar having a swing portion and being pivotally coupled to the support member by a pin at a middle portion of the support member;

transmission means for transmitting a movement of the actuating bar to a horizontally reciprocating movement;

an oscillator driven by the horizontally reciprocating movement;

an inner blade member coupled to the oscillator, the inner blade member including a plurality of inner blades, each inner blade having an outer edge;

an outer blade member positioned so that the outer edges of the inner blades slidingly engage the outer blade member; and a spring pressing the outer edges of the inner blades to the outer blade member, wherein the transmission means includes a vertical slit in the oscillator, the actuating bar having a projection inserted in the vertical slit and loosely coupled to the vertical slit, and a first distance from said pin to said projection is greater than a second distance from said post to said projection.

12. The electric shaver according to claim 11, wherein the oscillator has an opening for insertion of said projection and upper portions of said pivot member and said support member including said post, said vertical slit being in a first face of said oscillator adjacent said opening, said oscillator including a cutout in a second face of said oscillator adjacent said opening and opposed to said first face, said cutout preventing said oscillator from touching an end of said post during said horizontally reciprocating movement.

13. The electric shaver according to claim 11, including a power source including an electromagnet for driving said pivot member, wherein the electromagnet includes a U-shaped core and coils wound around each end of the U-shaped core, the electric shaver including:

a switching structure including:
  a knob portion for being moved by a finger;
  an electric operation portion for electric operation, cooperating with an electric circuit, and the knob portion; and
  a rod portion for connecting the knob portion to the electric operation portion, the rod portion being located in a space between the coils.

14. The electric shaver of claim 13, including a pair of guide means for guiding movement of the rod portion, the guide means being located on both sides of the rod portion, between the coils.

15. The electric shaver according to claim 14, wherein the oscillator has an opening for insertion of said projection and upper portions of said pivot member and said support member including said post, said vertical slit being in a first face of said oscillator adjacent said opening, said oscillator including a cutout in a second face of said oscillator adjacent said opening and opposed to said first face, said cutout preventing said oscillator from touching an end of said post during said horizontally reciprocating movement.

16. The electric shaver according to claim 13, wherein the oscillator has an opening for insertion of said projection and upper portions of said pivot member and said support member including said post, said vertical slit being in a first face of said oscillator adjacent said opening, said oscillator including a cutout in a second face of said oscillator adjacent said opening and opposed to said first face, said cutout preventing said oscillator from touching an end of said post during said horizontally reciprocating movement.

* * * * *